US008955080B2

(12) United States Patent
Brunswig et al.

(10) Patent No.: US 8,955,080 B2
(45) Date of Patent: Feb. 10, 2015

(54) MANAGING SINGLE SIGN-ONS BETWEEN DIFFERENT ENTITIES

(71) Applicants: Frank Brunswig, Heidelberg (DE); Peter Dell, Lebach (DE); Klaus Herter, Leimen (DE); Bare Said, St. Leon-Rot. (DE)

(72) Inventors: Frank Brunswig, Heidelberg (DE); Peter Dell, Lebach (DE); Klaus Herter, Leimen (DE); Bare Said, St. Leon-Rot. (DE)

(73) Assignee: SAP SE, Walldorf (DE)

( * ) Notice: Subject to any disclaimer, the term of this patent is extended or adjusted under 35 U.S.C. 154(b) by 119 days.

(21) Appl. No.: 13/708,080

(22) Filed: Dec. 7, 2012

(65) Prior Publication Data

US 2014/0165150 A1    Jun. 12, 2014

(51) Int. Cl.
*H04L 29/06*     (2006.01)
*G06F 21/41*     (2013.01)
*G06F 21/31*     (2013.01)

(52) U.S. Cl.
CPC ............ *H04L 63/0815* (2013.01); *G06F 21/41* (2013.01); *H04L 63/10* (2013.01); *G06F 21/31* (2013.01)
USPC ............................................. 726/8; 713/158

(58) Field of Classification Search
CPC .......... G06F 21/31; H04L 63/08; H04L 63/10
USPC ............................................................ 726/4
See application file for complete search history.

(56) References Cited

U.S. PATENT DOCUMENTS

| 7,979,542 | B2 * | 7/2011 | Strohwig et al. | 709/224 |
| 8,473,735 | B1 * | 6/2013 | Jarvie et al. | 713/156 |
| 8,549,300 | B1 * | 10/2013 | Kumar et al. | 713/175 |
| 2005/0154909 | A1 * | 7/2005 | Zhang et al. | 713/200 |
| 2005/0273610 | A1 * | 12/2005 | Kaneda | 713/173 |
| 2011/0099618 | A1 * | 4/2011 | Mutt | 726/8 |
| 2011/0231919 | A1 * | 9/2011 | Vangpat et al. | 726/8 |

OTHER PUBLICATIONS

HttpWatch 8.5—integrated HTTP sniffer to IE and Firefox (http://www.httpwatch.com/) last visited Dec. 5, 2012.

* cited by examiner

*Primary Examiner* — Hadi Armouche
*Assistant Examiner* — Bryan Wright
(74) *Attorney, Agent, or Firm* — Fish & Richardson P.C.

(57) ABSTRACT

The disclosure generally describes computer-implemented methods, software, and systems for cloud-based single sign-on (SSO) capabilities. A computer-implemented method includes operations for identifying a first system for single sign-on capabilities, identifying a second system disparate from the first system for providing a single sign-on capability with the first system through a cloud-based SSO configuration manager, automatically accessing metadata associated with the sign-on information of the second system, the set of metadata identifying sign-on-related information for sharing at least one credential/certificate for logging in to the second system, using the metadata to obtain an authorization for a single sign-on between the first and second systems, receiving a request from the first system for authorization at the second system, and, in response to the request, providing the authorization and creating a cloud-based SSO system that includes the first and second systems.

17 Claims, 7 Drawing Sheets

MANAGING SINGLE SIGN-ONS BETWEEN DIFFERENT ENTITIES

TECHNICAL FIELD

The present disclosure relates to computer-implemented methods, software, and systems for configuring and monitoring a single sign-on system.

BACKGROUND

Users on the Internet may use multiple systems in their day-to-day activities. The multiple systems may be associated with different organizations and companies. In some cases, users may use a single sign-on (SSO) to access the multiple systems. To configure the multiple systems into a connected environment or landscape, a central system administrator associated with configuring and connecting the multiple systems may need to communicate (e.g., via email) with each of the system administrators associated with the multiple systems to obtain necessary metadata. For example, the metadata can include certificate information, encryption information and other information needed for logging into the systems. If something goes wrong, such as an expired certificate, the central system administrator may need to send an email to the system administrator of the affected system, and use information from the email in order to correct the problem.

SUMMARY

The present disclosure relates to computer-implemented methods, software, and systems for configuring and monitoring a landscape of systems connected using a centralized solution to provide a single sign-on (SSO) for the systems connected in a cloud. One example process includes operations for identifying a first system for single sign-on capabilities, identifying a second system disparate from the first system for providing a single sign-on capability with the first system through a cloud-based SSO configuration manager, automatically accessing metadata associated with the sign-on information of the second system, the set of metadata identifying sign-on-related information for sharing at least one credential/certificate for logging in to the second system, using the metadata to obtain an authorization for a single sign-on between the first and second systems, receiving a request from the first system for authorization at the second system, and, in response to the request, providing the authorization and creating a cloud-based SSO system that includes the first and second systems.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure relates to computer-implemented methods, software, and systems for configuring and monitoring a landscape of systems connected using a centralized solution. The solution provides a consistent environment in the cloud to connect different systems across organizations, locations and companies in single sign-on (SSO) scenario.

For example, the strong focus of the on-demand business world and the growing number of cloud-based applications offers many new business opportunities. A consistent SSO set-up and support for cloud and/or non-cloud systems can provide a common set up environment that further supports an organized exchange of system meta-data. This can eliminate the need by system administrators for carrying out individual and unsecure data exchange of security relevant metadata, e.g., for signing and encryption certificates across disparate organizations and companies. For example, a consistent SSO set-up and support can replace mail-based or other processes that are unsecure, error-prone and time-consuming. Point-to-point agreements, normally handled manually, can be integrated with real-time access of system metadata, e.g., in a common set-up environment that connects all involved system administrators of the different systems. Each system administrator can only access his own system's data. The problems of individual/unsecure data exchange, having mail-based systems, and other inherit problems can be solved by providing a cloud-based application. For example, the application can be a global system for SSO configuration, set-up and monitoring across systems of different organizations and companies, e.g., a cloud-based SSO configuration manager (CSCM).

Figure 1:
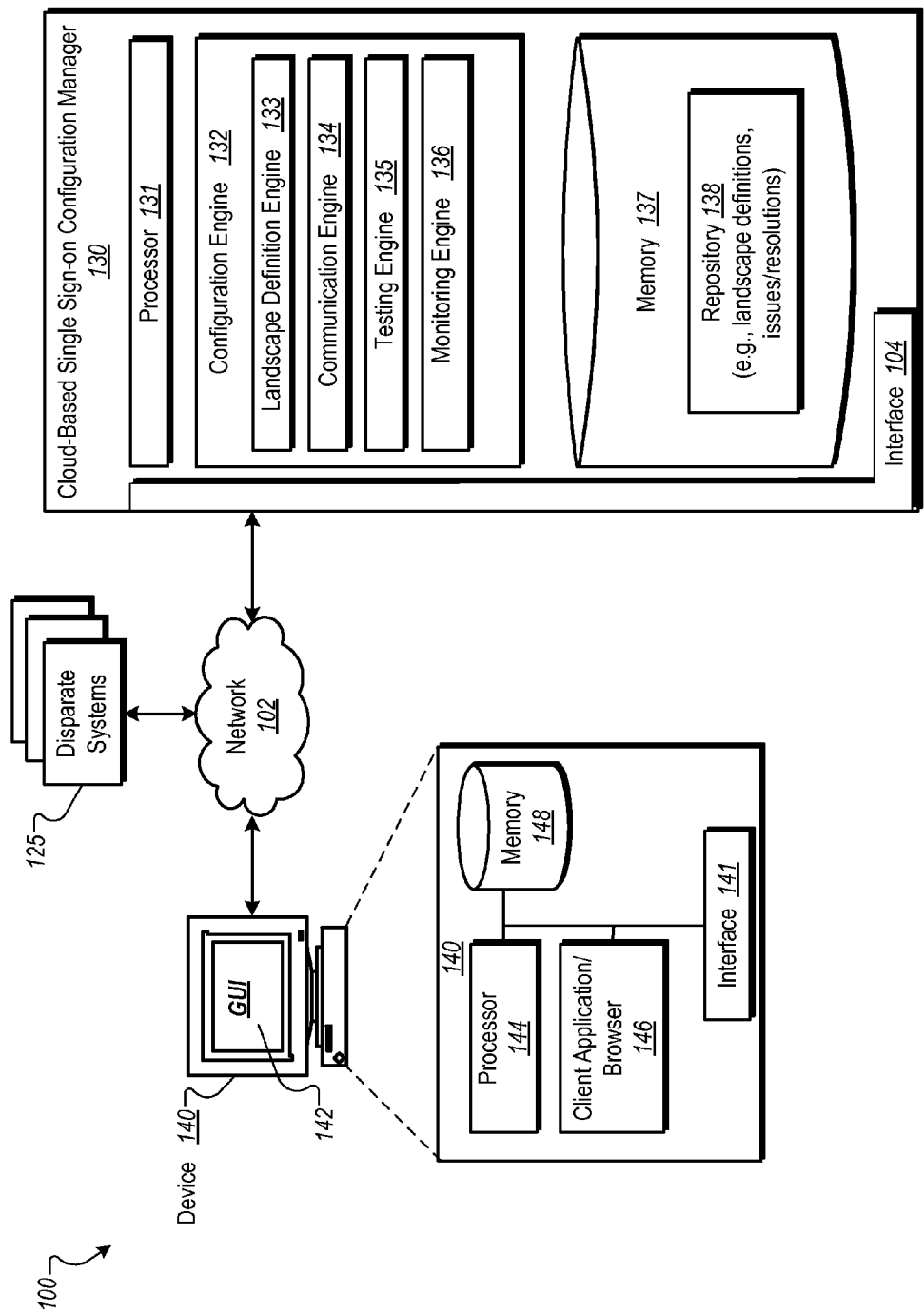
FIG. 1 illustrates an example environment that includes a landscape of systems connected using a centralized solution to provide a single sign-on for the systems connected in a cloud.

FIG. 1 illustrates an example environment that includes a landscape of systems connected using a centralized solution to provide a single sign-on (SSO) for the systems connected in a cloud. Specifically, the illustrated environment 100 includes, or is communicably coupled with, a cloud-based SSO configuration manager 130 that serves as the centralized solution. The environment 100 also includes a device 140 by which users, e.g., system administrators, can provide inputs for configuring and testing the landscape of connected systems disparate 125. Other operations can enable system administrators located in different companies, for example, to set up, test and monitor the SSO configuration and artifacts across connected systems. For example, a user using the device 140 may select specific disparate systems 125 to connect to (and disconnect from) the landscape. The disparate systems 125, for example, may be related to payroll, accounting, customer resource management, purchasing/sales, inventory, business objects, or any other suitable applications and/or systems. In another example, the disparate systems 125 may include one or more booking services, airlines, car rentals, hotel accommodations, merchandise and/or other products and services. Generally, any suitable set of disparate systems 125 may be associated with and included within the landscape of systems. Specifically, the cloud-based SSO configuration manager 130 can provide information so that a system administrator who, for example, is designing a network of connected systems can view information (e.g., graphically) as to which disparate systems 125 are connected in the landscape. Further, system administrators associated with the various disparate systems 125 may also be able to view information on the connected systems and make centralized changes to one or more of their related systems and settings. The cloud-based SSO configuration manager 130 can also support monitoring and testing of the configurations with the disparate systems 125.

In general, the cloud-based SSO configuration manager 130 is a system and/or server that provides services for configuring and monitoring the landscape, and that can be interfaced by the device 140 to interact with the services. For example, a user using the device 140 can access information that is processed by the cloud-based SSO configuration manager 130. In some implementations, the cloud-based SSO configuration manager 130 may comprise a Web server, one or more Web-based applications accessed and executed by the device 140 via the network 102. At a high level, the cloud-based SSO configuration manager 130 comprises an electronic computing device operable to receive, transmit, process, store, or manage data and information associated with the environment 100.

As used in the present disclosure, the term "computer" is intended to encompass any suitable processing device. For example, although FIG. 1 illustrates a single cloud-based SSO configuration manager 130, the environment 100 can be implemented using two or more cloud-based SSO configuration managers 130, as well as computers other than servers, including a server pool. Indeed, the cloud-based SSO configuration manager 130 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated cloud-based SSO configuration manager 130 may be adapted to execute any operating system, including Linux, UNIX, Windows, Mac OS®, Java™, Android™, iOS or any other suitable operating system. According to one implementation, the cloud-based SSO configuration manager 130 may also include, or be communicably coupled with, an e-mail server, a Web server, a caching server, a streaming data server, and/or other suitable server.

The cloud-based SSO configuration manager 130 also includes an interface 104, a configuration engine 132, and a memory 137. The interface 104 is used by the cloud-based SSO configuration manager 130 for communicating with other systems in a distributed environment—including within the environment 100—connected to the network 102 (e.g., the device 140), as well as the disparate systems 125. Generally, the interface 104 comprises logic encoded in software and/or hardware in a suitable combination and operable to communicate with the network 102. More specifically, the interface 104 may comprise software supporting one or more communication protocols associated with communications such that the network 102 or interface's hardware is operable to communicate physical signals within and outside of the illustrated environment 100.

As illustrated in FIG. 1, the cloud-based SSO configuration manager 130 includes a processor 131. Although illustrated as a single processor 131 in FIG. 1, two or more processors 131 may be used according to particular needs, desires, or particular implementations of the environment 100. Each processor 131 may be a central processing unit (CPU), a blade, an application specific integrated circuit (ASIC), a field-programmable gate array (FPGA), or another suitable component. Generally, the processor 131 executes instructions and manipulates data to perform the operations of the cloud-based SSO configuration manager 130. The processor 131 executes the functionality required to receive and respond to requests from the device 140.

The cloud-based SSO configuration manager 130 includes a configuration engine 132 which includes applications that provide business-related functionality, e.g., for users of devices 140, as well as devices (not shown) associated with the disparate systems 125. Operations of the configuration engine 132 are executed by the processor 131. The configuration engine 132 generally provides for defining, modifying and monitoring a configured landscape of disparate systems that are associated with a single sign-on.

In some implementations, the configuration engine 132 includes a landscape definition engine 133, a communication engine 134, a testing engine 135, and a monitoring engine 136. The landscape definition engine 133 is a program, application, module, or other software that logically connects disparate systems 125 to the landscape, e.g., specified by user inputs on the device 140.

The communication engine 134 handles communication between the cloud-based SSO configuration manager 130 and disparate systems 125. For example, the communication can include email or other messages asking administrators at the disparate systems 125 to expose their metadata, e.g., for the purposes of adding the disparate systems 125 to the landscape, or to confirm the validity of currently exposed metadata. Metadata can include and/or be related to, for example, encryption certificates, certification/authentication, signing certificates, redirection universal resource locators (URLs), security assertion markup language (SAML), and others. The communication engine 134 can also be used to identify and exchange/transmit relevant metadata needed for configuring and communication among the disparate systems 125 and the landscape.

The testing engine 135 can test connections and/or other aspects associated with the landscape and connected disparate systems 125. The tests can be based on received user inputs (e.g., received from the device 140). For example, the system administrator associated with the cloud-based SSO configuration manager 130 can use an interface on the device 140 to initiate tests. Example tests include pinging a particular one of the disparate systems 125, testing a login to one of the disparate systems 125, and other suitable tests. Additionally, the testing engine 135 can be used to test landscape information and definitions stored in repository 138 as described below.

The monitoring engine 136 can monitor pre-defined aspects of the landscape. For example, the monitoring engine 136 can determine when expiration dates of certificates are approaching, e.g., to automatically generate a communication that can be sent by the communication engine 134 to a system administrator of the corresponding disparate system 125. The monitoring engine 136 may perform its operations on a constant basis, a pre-defined schedule, or at specific intervals. In some instances, for example, the monitoring engine 136 can monitor data within repository 138 to identify potential issues throughout the landscape. In other instances, the monitoring engine 136 may be triggered manually to investigate certain landscape data and parameters in response to a request from one or more users or systems.

The cloud-based SSO configuration manager 130 also includes a memory 137, or multiple memories 137. The memory 137 may include any type of memory or database module and may take the form of volatile and/or non-volatile memory including, without limitation, magnetic media, optical media, random access memory (RAM), read-only memory (ROM), removable media, or any other suitable local or remote memory component. The memory 137 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the cloud-based SSO configuration manager 130. Additionally, the memory 137 may include any other appropriate data, such as VPN applications, firmware logs and policies, firewall policies, a security or access log, print or other reporting files, as well as others.

As illustrated in FIG. 1, the memory 137 includes a repository 138 that can include, for example, landscape definitions, issues/resolutions and other information. For example, the repository 138 can store information regarding the disparate systems 125 that are connected in a single sign-on landscape, as well as information (including information associated with the disparate systems' exposed metadata) for making the centralized SSO landscape possible. The repository 138 can also store information about issues encountered and the corresponding steps that may be used to resolve them. For example, resolution information for a failed test of a connection with a disparate system 125 can include steps (e.g., displayed on the device 140) that the system administrator can take to correct the problem. Other components within the memory 137 are possible.

The illustrated environment of FIG. 1 also includes the device 140, or multiple devices 140. The device 140 may be any suitable computing device operable to connect to, or communicate with, at least the cloud-based SSO configuration manager 130 via the network 102 using a wire-line or wireless connection. In general, the device 140 comprises an electronic computer device operable to receive, transmit, process, and store any appropriate data associated with the environment 100 of FIG. 1.

The illustrated device 140 further includes a client application/browser 146. The client application/browser 146 is any appropriate type of application that allows the device 140 to request and view content on the device 140. In some implementations, the client application/browser 146 can be and/or include a Web browser. In some implementations, the client application/browser 146 can use parameters, metadata, and other information received at launch to access a particular set of data from the cloud-based SSO configuration manager 130. Once a particular client application/browser 146 is launched, a user may interactively process a task, event, or other information associated with the cloud-based SSO configuration manager 130. Further, although illustrated as a single client application/browser 146, the client application/browser 146 may be implemented as multiple client applications in the device 140.

The illustrated device 140 further includes an interface 141, a processor 144, and a memory 148. The interface 141 is used by the device 140 for communicating with other systems in a distributed environment—including within the environment 100—connected to the network 102; for example, the cloud-based SSO configuration manager 130, as well as other systems communicably coupled to the network 102 (not illustrated). Generally, the interface 141 comprises logic encoded in software and/or hardware in a suitable combination and operable to communicate with the network 102. More specifically, the interface 141 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any suitable combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the device 140 includes the processor 144. Although illustrated as the single processor 144 in FIG. 1, two or more processors 144 may be used according to particular needs, desires, or particular implementations of the environment 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the device 140. Specifically, the processor 144 executes the functionality required to send requests to the cloud-based SSO configuration manager 130 and to receive and process responses from the cloud-based SSO configuration manager 130.

The illustrated device 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the device 140. Additionally, the memory 148 may include any other appropriate data, such as VPN applications, firmware logs and policies, firewall policies, a security or access log, print or other reporting files, as well as others.

There may be any number of devices 140 associated with, or external to, the environment 100. For example, while the illustrated environment 100 includes one device 140, alternative implementations of the environment 100 may include multiple devices 140 communicably coupled to the cloud-based SSO configuration manager 130 and/or the network 102, or any other number suitable to the purposes of the environment 100. Additionally, there may also be one or more additional devices 140 external to the illustrated portion of environment 100 that are capable of interacting with the environment 100 via the network 102. Further, the term "client" and "user" may be used interchangeably as appropriate without departing from the scope of this disclosure. Moreover, while the device 140 is described in terms of being used by a single user, this disclosure contemplates that many users may use one computer, or that one user may use multiple computers.

The illustrated device 140 is intended to encompass any suitable computing device such as a smart phone, tablet computing device, PDA, desktop computer, laptop/notebook computer, wireless data port, one or more processors within these devices, or any other suitable processing device. For example, the device 140 may comprise a computer that includes an input device, such as a keypad, touch screen, or other device that can accept user information, and an output device that conveys information associated with the operation of the cloud-based SSO configuration manager 130 or the device 140 itself, including digital data, visual information, or a GUI 142, as shown with respect to the device 140.

Further, the illustrated device 140 includes the GUI 142. The GUI 142 interfaces with at least a portion of the environment 100 for any suitable purpose, including generating a visual representation of a Web browser. In particular, the GUI 142 may be used to view and navigate various Web pages located both internally and externally to the cloud-based SSO configuration manager 130. The GUI 142 further generates a visual representation of the client application/browser 146 that executes on the device 140. The GUI 142 may be used, for example, in presenting the visualizations and information associated with the cloud-based SSO configuration as provided in FIGS. 3-5.

Figure 2:
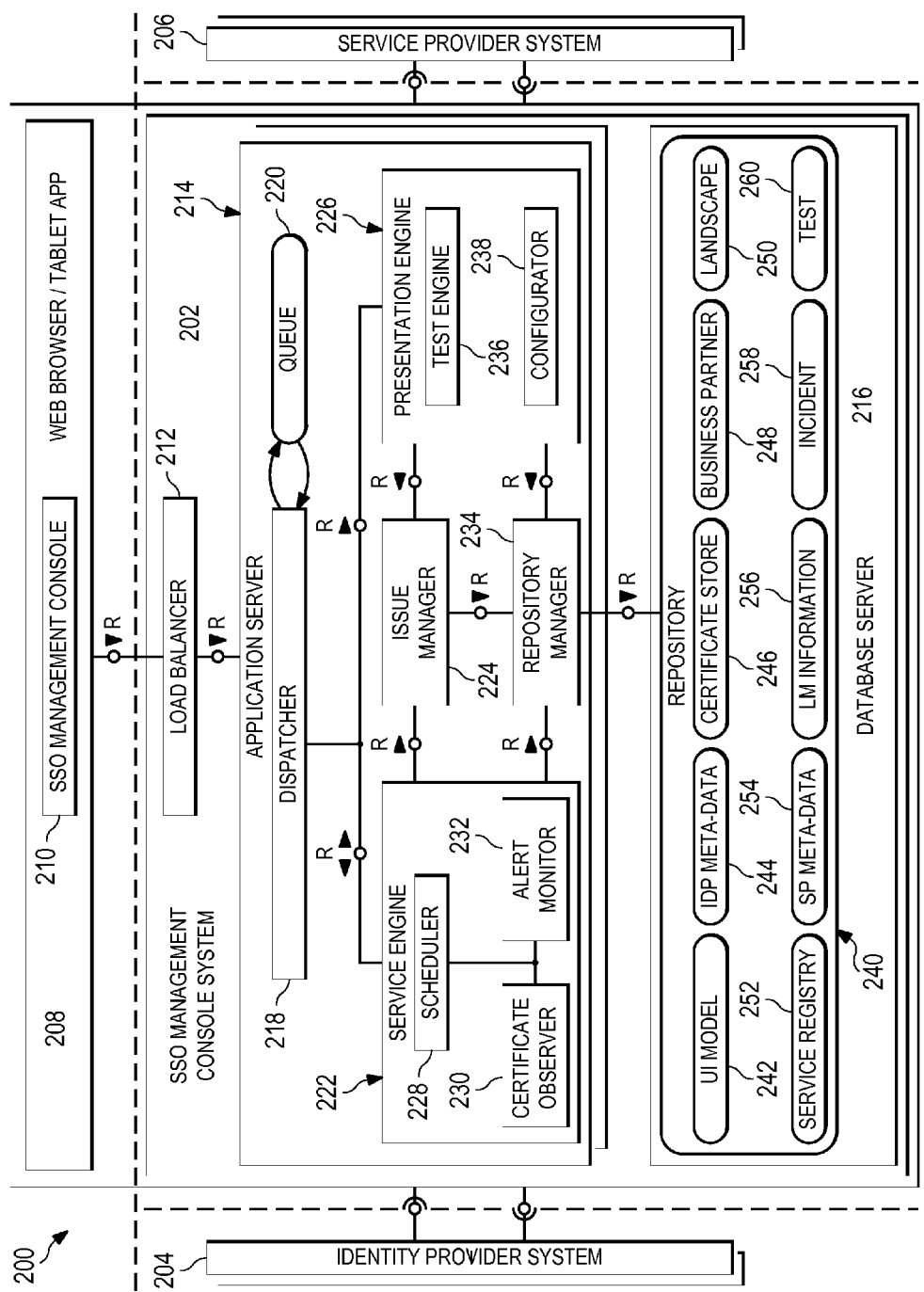
FIG. 2 is an illustration of an example architecture for a cloud-based SSO configuration manager.

FIG. 2 is an illustration of an example architecture 200 for a cloud-based SSO configuration manager. For example, the architecture 200 may be used by the cloud-based SSO configuration manager 130 or some other suitable cloud-based SSO configuration manager. The architecture 200 can support the design and configuration of a landscape of systems in an SSO environment. The architecture 200 can also support runtime testing and monitoring of the defined landscape. For example, the landscape can connect one or more identity provider systems 204 with one or more service provider systems 206. An SSO management console system 202 can be used to define the landscape and to configure, connect, test and monitor the systems 204 and 206 within the landscape.

Generally, the architecture 200 can provide high availability and scalability and can be accessed via a common web browser or mobile application having REST- and HTTP-based protocols. For example, the architecture 200 can be accessed by system administrators associated with particular systems in the SSO environment, as well as or including a system administrator who defines and maintains the landscape, e.g., using a Web browser/tablet application 208 that executes on an SSO management console 210.

In some implementations, the SSO management console system 202 includes a load balancer 212, at least one application server 214, and a database server 216. The load balancer 212, for example, can handle incoming requests from various systems. For example, the requests may originate from the Web browser/tablet application 208 executing on the SSO management console 210. Requests may also originate from user interface clients and/or user interface applications that execute on the identity provider systems 204 or service provider systems 206. In some implementations, when handling a request, the load balancer 212, for example, can re-direct the request to the dispatcher of a particular application server 214 that has performance and resources that best match the request.

In some implementations, each application server 214 can include plural components. A dispatcher 218, for example, can store a request received by the SSO management console system 202 in a queue 220 until the request can be handled by one of plural engines (e.g., a service engine 222, a presentation engine 226, or some other suitable engine). The presentation engine 226, for example, can create information to be presented on user interfaces, including the SSO management console 210. The information can include information used in configuring systems within the landscape, information defining current connections within the landscape, and information for testing connections with systems in the landscape. The service engine 222, for example, can operate in the background and can include a scheduler 228 for scheduling services to be performed based on received requests, a certification observer 230 for certifying and reviewing the validity of certificates, and an alert monitor 232 for monitoring certificates.

The SSO management console system 202 can also include an issue manager 224. For example, landscapes/configurations that are defined by a system administrator may have issues such as inconsistent metadata, invalid HTTP endpoints, corresponding systems that are not available, expired certificates, or required identity mappings that are not supported. These issues and other issues can be handled by the issue manager 224. In some implementations, the issue manager 224 can communicate with a repository manager 234 that manages a repository 240, e.g., stored in the database server 216. For example, the information in the repository 240 that is available to the repository manager 234 can include a history of issues and incidents that apply to any current and former systems connected in the landscape. The issue manager 224 can use the information, for example, to look up an issue in the repository 240 in order to locate one or more possible solutions.

The repository 240 can include information such as metadata 244 and 254 associated with particular IPSes and SPSes, certificates 246, business partners 248, user interface models 242, landscapes 250, a service registry 252, lifecycle management (LM) information 256, incidents 258, and test information 260. The repository 240 stores data in a system-specific way (e.g., by company, etc.) so that critical data, such as certificates, is accessible only by a user, system administrator, or system authorized to access the information.

In one example scenario using components of the architecture 200, ABC Company may want to use external booking service XYZ that is available, for example, as an on-demand cloud service. The identity provider system 204 in this example is associated with, and located in, the system landscape of the ABC Company, and the service provider system 206 is the external booking service XYZ. A system administrator of the ABC Company system can logon to the SSO management console system 202 via the SSO management console 210, and then describe and configure the system landscape. It may be the case that the needed SPS 206 and IPS 204 metadata and the users of the ABC Company are already defined to or loaded in the SSO management console system 202. If so, the system administrator has only to configure the link to the external booking service XYZ. Then, the SSO management console system 202 can manage the further configuration of the single sign-on certification and HTTP endpoint exchanges and the required user provisioning in the external booking service XYZ system. After the system administrator has activated this new SSO configuration, the SSO management console system 202 may observe, for example, expiration dates of certificates. This can automatically trigger alerts to be sent to the responsible system administrators to take action to update these certificates.

In some implementations, the SSO management console system 202 can be part of a particular company landscape. In some implementations, the SSO management console system 202 can be a centralized, on-demand service. For example, while the SSO management console system 202 is associated with ABC Company's system, the SSO management console system 202 can be made available as a cloud-based solution such that all involved systems can easily and centrally access the configuration and other functionality. In some implementations, the SSO management console system 202 can be provided outside of the SSO participating systems.

Figure 3:
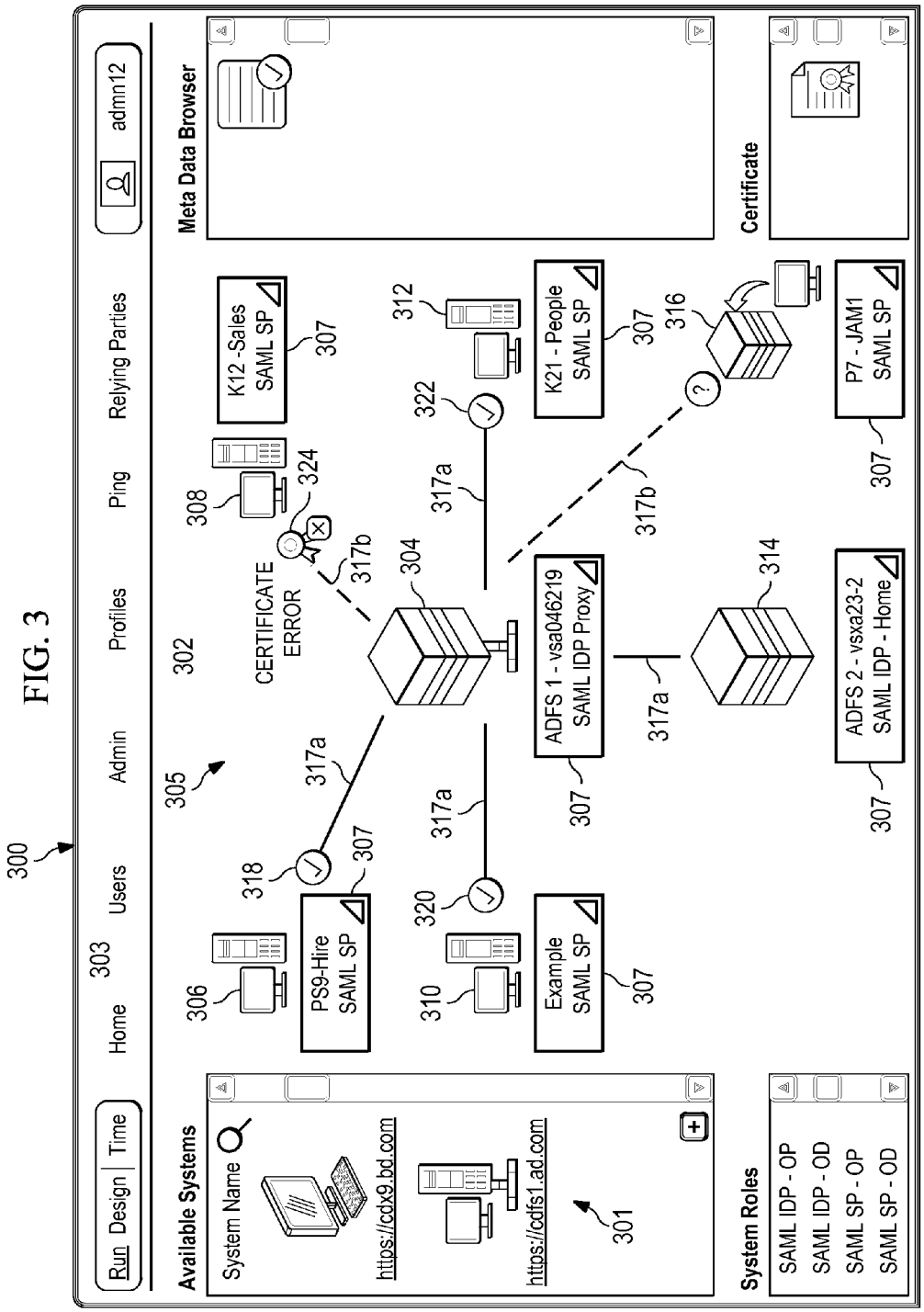
FIG. 3 shows an example landscape of systems that are connected and configured for using single sign-on capabilities.

FIG. 3 shows an example landscape 305 of systems 304-316 that are connected and configured for using single sign-on capabilities. Except as indicated below, each of the components in the landscape 305 has been navigated, identified and connected, e.g., using tools available in a user interface 300. In some implementations, the user interface 300 can provide, among other presentations, a design-time view of the landscape 305 that can include a description of the associated systems as well as a set of identified issues, e.g., certificate errors for system-system communication, where some certificates may be outdated, inconsistent, or have other problems.

The landscape 305 can be presented, for example, in a user interface associated with managing the cloud-based SSO configuration manager associated with the cloud-based SSO system, e.g., generated by the SSO management console system 202 for display in the Web browser/tablet application 208. The interface can include, for example, a graphical representation for the cloud-based SSO system, including the cloud-based SSO configuration manager and the one or more systems in the cloud-based SSO system. The interface can also include, for example, controls for selection of actions to be performed related to the cloud-based SSO system and management of the cloud-based SSO configuration manager.

In some implementations, e.g., to design the landscape 305, the user can select one of the available systems 301, e.g., to drag and drop into a design area 302. For example, before a landscape is defined, design area 302 may be empty. The user can use one or more of controls 303, for example, to select from existing profiles from which to design the landscape 305 from a template. One example template can include a centralized identity provider service (IPS) (e.g., IPS 304) surrounded by plural service provider systems (SPSes) (e.g., SPSes 306-316). At the time that the user selects a template or other profile to begin to design a landscape, the specific names of the IPSes and SPSes may not be displayed (as they have not been chosen yet), but rather icons that represent IPSes and SPSes can be displayed, e.g., in gray. As each of the available systems 301 is dragged and dropped onto the template in the design area 302, the names are filled in, e.g., to match the names displayed in the available systems 301.

In some implementations, solid connection lines 317a with associated success icons 318-322 (e.g., shown here as checkmarks) can indicate successful connection and communication among systems, e.g., for SPSes 306-312 connected to the centralized IPS 304. In some implementations, dashed connection lines 317b can represent connections that have issues and/or problems related to, for example, communication errors, invalid/expired certificates, or other reasons. For example, a certificate error icon 324 can indicate that there is a problem with a certificate needed for communication between the IPS 304 and the SPS 308. In some implementations, different symbols and/or different colors can be used to provide a visual distinction between successful and unsuccessful connections, e.g., using green for check-marked success icons 318-322 and red for the certificate error icon 324. Other visual cues and distinctions can be used. In some implementations, dashed connection lines 317b can be used to indicate connections that have yet to be fully made, such as the dashed connection line 317b that connects the centralized IPS 304 with the SPS 316.

In some implementations, boxes 320 (e.g., that are displayed next to icons representing the various systems) can display high-level information about a particular system. In some implementations, a user can dive into and/or display detailed information for a particular system by selecting one of the boxes, e.g., by selecting a control in the corner of a box. In some implementations, the detailed information can include information about the system's role, its creation date, internet Protocol (IP) address, last load date of the metadata, and other information. In some implementations, the detailed information displayed for a system can include actionable options, such as controls for pinging the system, editing permissions, setting SSO endpoints, and other suitable actions and options.

In some implementations, other actions can be performed by system administrators using the user interface 300 or other user interfaces, as in the following examples. A system administrator can set or access a security assertion markup language (SAML) uniform resource locator (URL) for a particular system in the cloud-based SSO system. A system administrator can set or access a signing certificate from a particular system in the cloud-based SSO system. A system administrator can set or access encryption certificate from a particular system in the cloud-based SSO system. A system administrator can set a relying party, e.g., a particular service provider system that relies on a particular identity provider system to execute user identification and authentication. A system administrator can set or access claiming rules, the claiming rules defining attributes used for user authentication, including a user identifier and email address. A system administrator can validate an SAML URL of a particular system in the cloud-based SSO system. A system administrator can validate the signing certificate of a particular system in the cloud-based SSO system. A system administrator can validate the encryption certificate of a particular system in the cloud-based SSO system. A system administrator can access the exposed metadata associated with a particular system in the cloud-based SSO system. Other suitable actions can be available in other implementations.

Figure 4:
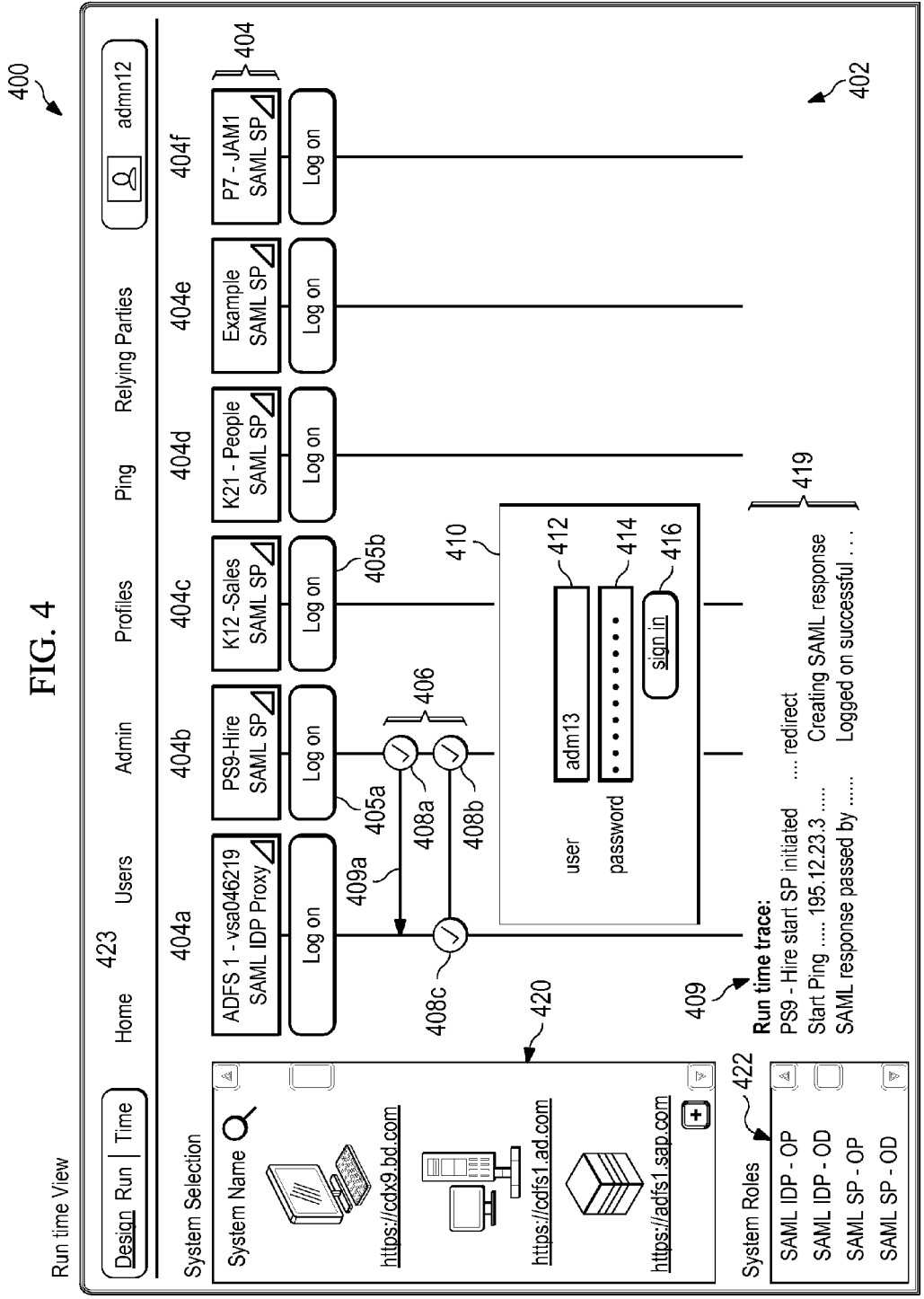
FIG. 4 shows an example run-time view for systems that are connected and configured for using single sign-on capabilities.

FIG. 4 shows an example run-time view 400 for systems 404 that are connected and configured for using single sign-on capabilities. For example, a user, such as a system administrator, can use the run-time view 400 to test systems within a simulation 402 that is presented within the run-time view 400.

In one example sequence of actions that use capabilities of the run-time view 400, the user can select a login control 405a associated with SPS 404b, e.g., to initiate a login test 406 to SPS 404b. As a result of selecting the login control 405a, a success status icon 408a (e.g., a green checkmark) is displayed that is connected to IPS 404a, e.g., using a directional line 409a to simulate a redirection to IPS 404a. As part of the simulated login process, a login popup 410 can be displayed that contains fields and controls that allow the system administrator to enter a username 412 and a password 414, then select a sign in control 416 to submit the login credentials. If the login credentials are received by IPS 404a, for example, and if the login is successful, then success status icons 408b and 408c can be displayed to indicate a successful test.

In some implementations, a run time trace area 409 can display a detailed log 419 that includes detailed log information associated with and coincident to whatever test is being run (e.g., the log in test 406). The run time trace is tailored to a particular SSO scenario and logs only relevant information related to a login and authentication procedure for the particular SSO scenario. The run time trace facilitates debugging and offers the user a more adequate tool than available generic HTTP monitoring tools such as HttpWatch (http://www.httpwatch.com/).

Figure 5:
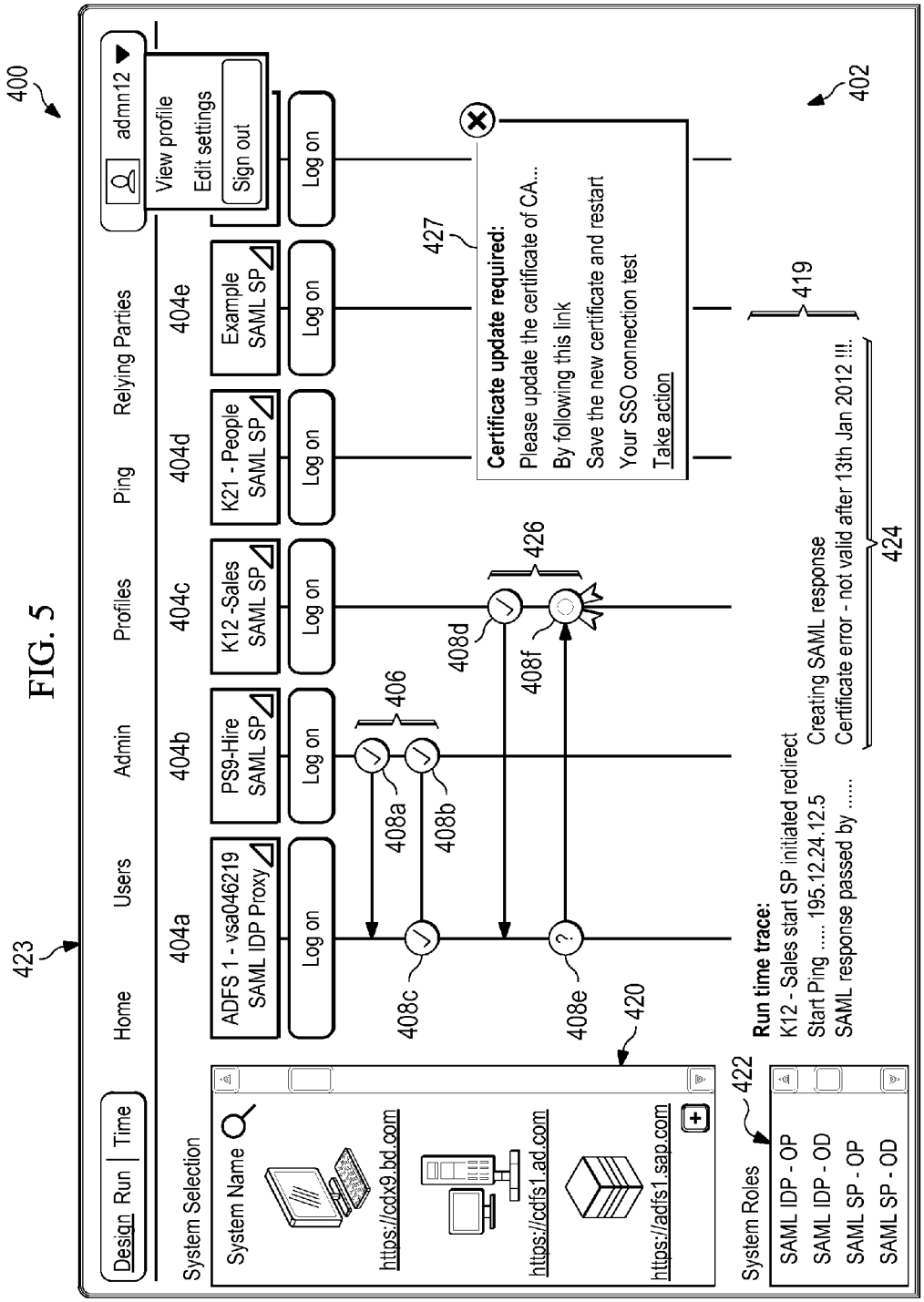
FIG. 5 presents an example user interface associated with a run-time test.

FIG. 5 presents an example user interface associated with a run-time test 426. For example, as part of the run-time test 426, the user can select a login control 405b associated with SPS 404c, e.g., to initiate a log in to SPS 404c (that is also redirected to IPS 404a). In this example, there is a problem with the certificate, e.g., a certificate error, as indicated in a detailed popup 427. Further, status icons 408d, 408e and 408f can indicate that the test started successfully, but did not end successfully, e.g., by using a different status icon 408f to indicate a problem with the certificate. In some implementations, the detailed popup 427 can include actionable controls, e.g., for the system administrator to take action to resolve the problem. Example options for taking action can include updating the certificate, saving the certificate and restarting, or some other action. In some implementation, a different font (e.g., bolding, red, etc.) or some other visual cue can be used to annotate important or critical information in the detailed log 419, such as a message 424 that identifies the specific certificate error including an expiration date.

Figure 6:
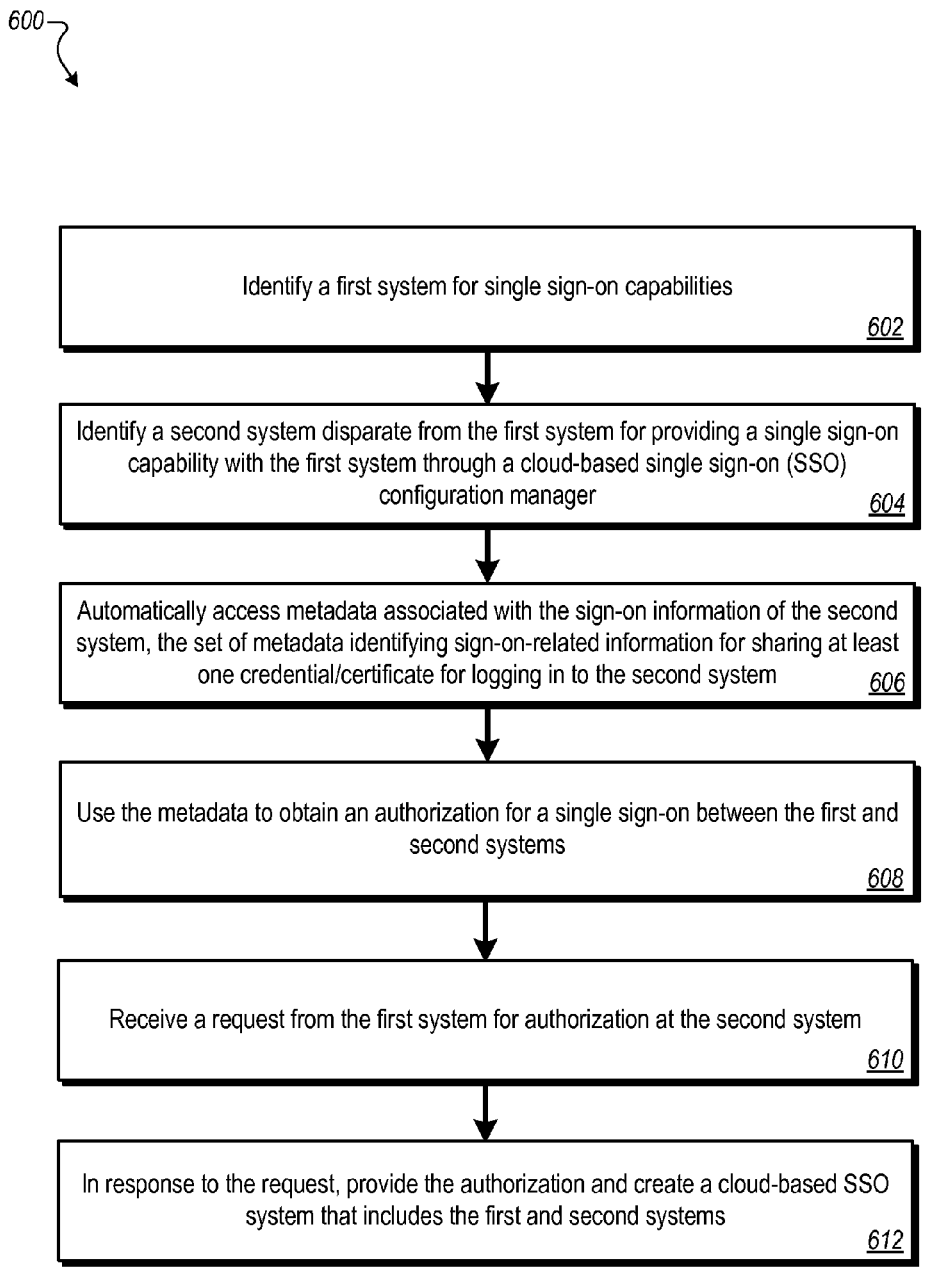
FIG. 6 is a flowchart of an example method for connecting a landscape of systems to provide a cloud-based single sign-on among the systems.

FIG. 6 is a flowchart of an example method 600 for connecting a landscape of systems to provide a cloud-based single sign-on (SSO) among the systems. For clarity of presentation, the description that follows generally describes method 600 in the context of FIGS. 1-3. For example, method 600 can be performed by the cloud-based SSO configuration manager 130 and/or other suitable entity. However, it will be understood that method 600 may be performed, for example, by any other suitable system, environment, software, and hardware, or a combination of systems, environments, software, and hardware, as appropriate.

At 602, a first system is identified for single sign-on capabilities. For example, the IPS 304 (e.g., Company ABC) can be identified as connected in a landscape that includes SPSes 306-316. The identification can occur, for example, when a user (e.g., system administrator) selects the IPS 304 to drag and drop into the center of the landscape 305.

At 604, a second system disparate from the first system is identified for providing a single sign-on capability with the first system through a cloud-based single sign-on (SSO) configuration manager. As an example, the system administrator can use the SSO management console 210 to select the SPS 306 (e.g., XYZ Booking) as a disparate system to be connected to the IPS 304 (e.g., Company ABC), e.g., as a drag-and-drop action from the available systems 301.

At 606, metadata associated with the sign-on information of the second system is automatically accessed. The set of metadata identifies sign-on-related information for sharing at least one credential/certificate for logging in to the second system. For example, after the system administrator associated with the SPS 306 (e.g., XYZ Booking) has exposed its metadata, the SSO management console system 202 can obtain the information from the repository 240, specifically SPS metadata 254.

In some implementations, the method 600 can further provide information for presentation of a central system administrator interface associated with a cloud-based single sign-on configuration manager. For example, some or all of the steps of method 600 can occur while a system administrator (e.g., associated with Company ABC) is using the device 140 interfaced with the cloud-based SSO configuration manager 130 to define a landscape of connected systems configured for SSO abilities. The system administrator can review the metadata associated with the second system without additional correspondence to system administrators of the second system (e.g., XYZ Booking).

At 608, the metadata is used to obtain an authorization for a single sign-on between the first and second systems. For example, referring to FIG. 3, the metadata can be used to conduct an authorization between the IPS 304 (e.g., Company ABC) and the SPS 306 (e.g., XYZ Booking).

At 610, a request is received from the first system for authorization at the second system. As an example, the SPS 306 can receive the request from the IPS 304 (e.g., Company ABC), as indicated by the 317a that connects the SPS 306 (e.g., XYZ Booking) and the IPS 304.

At 612, in response to the request, the authorization is provided, and a cloud-based SSO system is created that includes the first and second systems. For example, the SPS 306 (e.g., XYZ Booking) is now connected to the IPS 304 (e.g., Company ABC) in the landscape 305, as indicated by the success icon 318.

In some implementations, the steps 602-612 can be repeated to add additional systems to the landscape. For example, adding a third system (e.g., Example Car Rental) to the cloud-based SSO system can include identifying the third system disparate from the first and second systems. Then, the cloud-based SSO configuration manager 130 can automatically access a set of metadata associated with the sign-on information of the third system (e.g., Example Car Rental) from the SSO configuration manager. The set of metadata here identifies sign-on-related information for sharing at least one credential/certificate for logging in to the third system (e.g., Example Car Rental). The cloud-based SSO configuration manager 130, for example, can use the metadata to obtain an authorization between the first, second and third systems (e.g., XYZ Booking, Company ABC, and Example Car Rental). The cloud-based SSO configuration manager 130 can then receive the request from the third system for authorization at the second system. In response to the request, cloud-based SSO configuration manager 130 can provide the authorization and update the cloud-based SSO system to include the first, second and third systems. Alternatively, the operations of 602-612 can be performed to add one or more additional systems into an already-existing cloud-based SSO system.

In some implementations, system administrators can test communications between particular ones of the systems and/or the cloud-based single sign-on configuration manager. For example, the system administrator associated with Company ABC can use the Web browser/tablet application 208 that executes on the SSO management console 210 to test communications with XYZ Booking and Example Car Rental). In some implementations, system administrators associated with the disparate systems can use similar interfaces to test communications between their systems and connected central systems.

In some implementations, method 600 can further include monitoring a set of certificates associated with at least one of the systems after creating the SSO system, determining that at least one of the certificates associated with one of the systems is nearing expiration, and alerting an administrator associated with the system of the nearing certificate expiration. For example, the alert monitor 232 (e.g., with inputs from the certification observer 230) can monitor certificates over time. If a certificate is about to expire, the alert monitor 232 can generate an alert that is receivable by one or more system administrators associated with central and/or disparate systems. In some implementations, other security mechanisms and/or other system-related aspects can be monitored in addition to the set of certificates.

Figure 7:
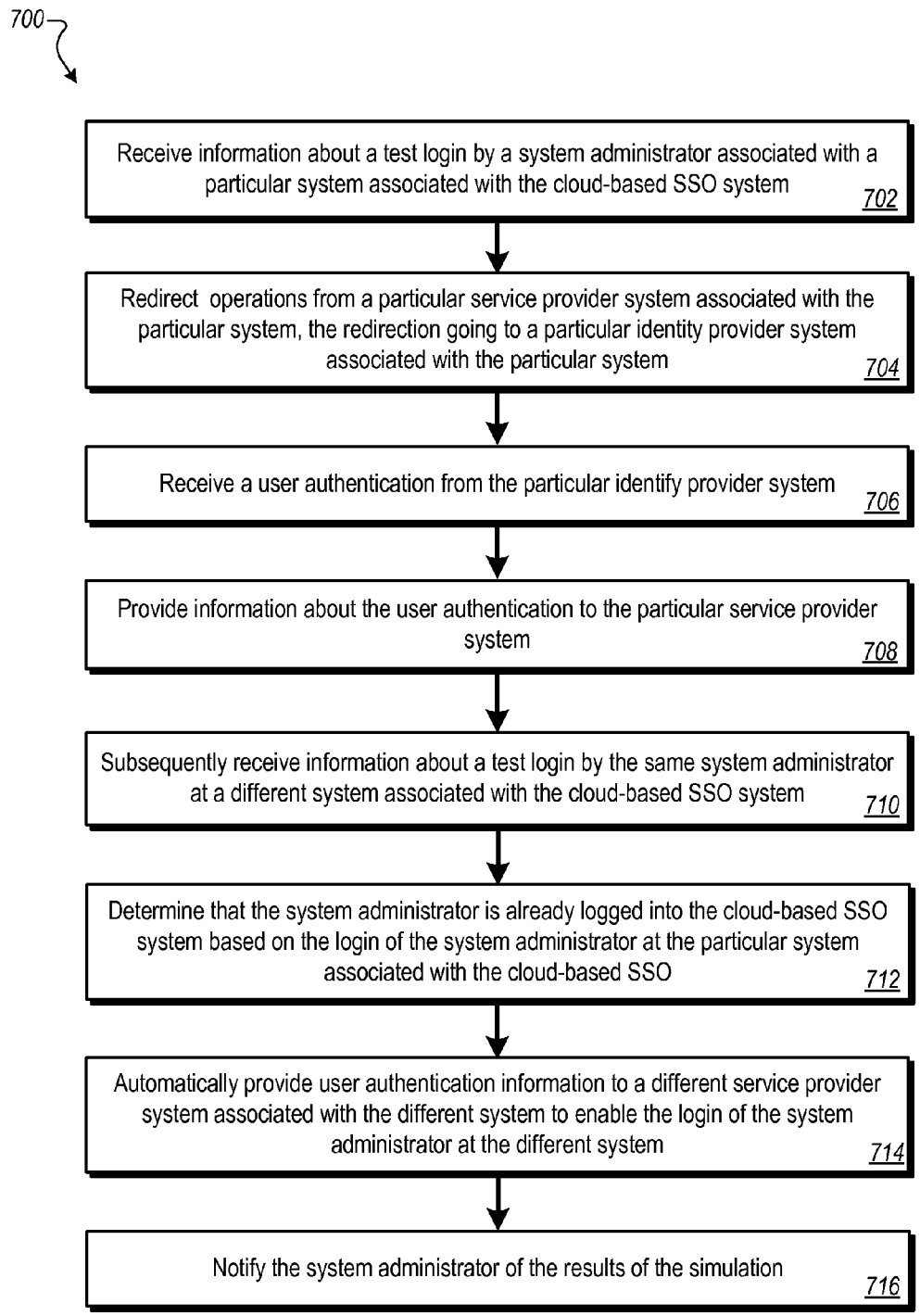
FIG. 7 is a flowchart of an example method for executing a simulation to test the cloud-based SSO system after its configuration.

FIG. 7 is a flowchart of an example method 700 for executing a simulation to test the cloud-based SSO system after configuration. For example, method 700 can follow completion of method 600. Alternatively, method 700 can be performed after any suitable cloud-based SSO system has been created and initially configured. For clarity of presentation, the description that follows generally describes method 700 in the context of FIGS. 1-5. For example, method 700 can be performed by the cloud-based SSO configuration manager 130 and/or another suitable entity, including using information from the run-time view 400. However, it will be understood that method 700 may be performed, for example, by any other suitable system, environment, software, and hardware, or a combination of systems, environments, software, and hardware, as appropriate.

At 702, information is received about a test login by a system administrator associated with a particular system associated with the cloud-based SSO system. For example, the cloud-based SSO configuration manager 130 can receive information that the user has selected the login control 405a associated with logging on to SPS 404b.

At 704, operations from a particular service provider system associated with the particular system are redirected, the redirection going to a particular identity provider system associated with the particular system. As an example, the login is redirected to IPS 404a, as shown by the directional line 409a in the simulation.

At 706, a user authentication is received from the particular identify provider system. For example, the IPS 404a can access authentication information for the login in the repository 240.

At 708, information about the user authentication is provided to the particular service provider system. As an example, the IPS 404a can provide the authentication for the login to the SPS 404b.

At 710, information is subsequently received about a test login by the same system administrator at a different system associated with the cloud-based SSO system. For example, the cloud-based SSO configuration manager 130 can receive information that the user has selected the login control 405b associated with SPS 404c, e.g., to initiate a log in to the SPS 404c.

At 712, is it determined that the system administrator is already logged into the cloud-based SSO system based on the login of the system administrator at the particular system associated with the cloud-based SSO. For example, cloud-based SSO configuration manager 130 can determine that the system administrator is already logged into the cloud-based SSO system.

At 714, user authentication information is automatically provided to a different service provider system associated with the different system to enable the login of the system administrator at the different system. For example, cloud-based SSO configuration manager 130 can provide the success status icon 408f, e.g., as using an icon that represents a certificate error.

At 716, the system administrator is notified of the results of the simulation. For example, the results of the simulated test are indicated in the status icon 408f, the detailed popup 427 and the run-time trace 419.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method executed by one or more processors, the method comprising:

identifying a first system for single sign-on capabilities;

identifying a second system disparate from the first system for providing a single sign-on capability with the first system through a cloud-based single sign-on (SSO) configuration manager;

automatically accessing metadata associated with the sign-on information of the second system, the set of metadata identifying sign-on-related information for sharing at least one credential/certificate for logging in to the second system;

using the metadata to obtain an authorization for a single sign-on between the first and second systems;

receiving a request from the first system for authorization at the second system;

in response to the request, providing the authorization and creating a cloud-based SSO system that includes the first and second systems;

monitoring a set of certificates associated with at least one of the first or second systems after creating the SSO system;

determining that at least one of the certificates associated with one of the first or second systems is nearing expiration; and alerting a system administrator associated with that system of the nearing certificate expiration.

2. The method of claim 1 wherein the method is performed, at least in part, by a cloud-based SSO configuration manager, the method further comprising:

providing information for presentation of a central system administrator interface associated with the cloud-based single sign-on configuration manager.

3. The method of claim 1 further comprising:

adding a third system to the cloud-based SSO system, including:

identifying a third system disparate from the first and second systems;

automatically accessing a set of metadata associated with the sign-on information of the third system from the SSO configuration manager, the set of metadata identifying sign-on-related information for sharing at least one credential/certificate for logging in to the third system;

using the metadata to obtain an authorization between the first, second and third systems;

receiving the request from the third system for authorization at the second system; and in response to the request, providing the authorization and creating a cloud-based SSO system that includes the first, second and third systems.

4. The method of claim 1 wherein the set of metadata associated with the second system is exposed by a system administrator associated with the second system.

5. The method of claim 4 wherein, after creating the cloud-based SSO system between the first and second systems, the set of metadata associated with the second system is available for review by a system administrator of the first system via the cloud-based SSO configuration manager without additional correspondence to system administrators of the second system.

6. The method of claim 1 further comprising testing communications between particular ones of the systems and/or the cloud-based single sign-on configuration manager.

7. The method of claim 1 further comprising executing a simulation to test the cloud-based SSO system after configuration, the simulation comprising operations including:

receiving information about a test login by a system administrator associated with a particular system associated with the cloud-based SSO system;

redirecting operations from a particular service provider system associated with the particular system, the redirection going to a particular identity provider system associated with the particular system;

receiving a user authentication from the particular identify provider system;

providing information about the user authentication to the particular service provider system;

subsequently receiving information about a test login by the same system administrator at a different system associated with the cloud-based SSO system;

determining that the system administrator is already logged into the cloud-based SSO system based on the login of the system administrator at the particular system associated with the cloud-based SSO;

automatically providing user authentication information to a different service provider system associated with the different system to enable the login of the system administrator at the different system; and notifying the system administrator of the results of the simulation.

8. The method of claim 1 wherein monitoring the set of certificates occurs at predefined time intervals.

9. The method of claim 1 further comprising:

providing information for presentation of a user interface associated with managing the cloud-based SSO configuration manager associated with the cloud-based SSO system, wherein the user interface includes:

a graphical representation for the cloud-based SSO system, including the cloud-based SSO configuration manager and the one or more systems in the cloud-based SSO system; and controls for selection of actions to be performed related to the cloud-based SSO system and management of the cloud-based SSO configuration manager.

10. The method of claim 9 wherein the actions to be performed include at least one of the following:

setting or accessing a security assertion markup language (SAML) uniform resource locator (URL) for a particular system in the cloud-based SSO system;

setting or accessing a signing certificate from a particular system in the cloud-based SSO system;

setting or accessing encryption certificate from a particular system in the cloud-based SSO system;

setting a relying party, wherein the relying party is a particular service provider system that relies on a particular identity provider system to execute user identification and authentication;

setting or access claiming rules, wherein the claiming rules define attributes used for user authentication, including a user identifier and email address;

validating a SAML URL of a particular system in the cloud-based SSO system;

validating the signing certificate of a particular system in the cloud-based SSO system;

validating the encryption certificate of a particular system in the cloud-based SSO system; and accessing the exposed metadata associated with a particular system in the cloud-based SSO system.

11. The method of claim 1 further comprising:

providing a run time trace tailored to a particular SSO scenario, the run time trace logging only relevant information related to a login and authentication procedure for the particular SSO scenario.

12. A system comprising:

one or more computers associated with business-related activities; and a computer-readable medium coupled to the one or more computers having instructions stored thereon which, when executed by the one or more computers, cause the one or more computers to perform operations comprising:

identifying a first system for single sign-on capabilities;

identifying a second system disparate from the first system for providing a single sign-on capability with the first system through a cloud-based single sign-on (SSO) configuration manager;

automatically accessing metadata associated with the sign-on information of the second system, the set of metadata identifying sign-on-related information for sharing at least one credential/certificate for logging in to the second system;

using the metadata to obtain an authorization for a single sign-on between the first and second systems;

receiving a request from the first system for authorization at the second system;

in response to the request, providing the authorization and creating a cloud-based SSO system that includes the first and second systems;

monitoring a set of certificates associated with at least one of the first or second systems after creating the SSO system;

determining that at least one of the certificates associated with one of the first or second systems is nearing expiration; and alerting a system administrator associated with that system of the nearing certificate expiration.

13. The system of claim 12 wherein the operations further comprise executing a simulation to test the cloud-based SSO system after configuration, the simulation comprising operations including:
- receiving information about a test login by a system administrator associated with a particular system associated with the cloud-based SSO system;
- redirecting operations from a particular service provider system associated with the particular system, the redirection going to a particular identity provider system associated with the particular system;
- receiving a user authentication from the particular identify provider system;
- providing information about the user authentication to the particular service provider system;
- subsequently receiving information about a test login by the same system administrator at a different system associated with the cloud-based SSO system;
- determining that the system administrator is already logged into the cloud-based SSO system based on the login of the system administrator at the particular system associated with the cloud-based SSO;
- automatically providing user authentication information to a different service provider system associated with the different system to enable the login of the system administrator at the different system; and
- notifying the system administrator of the results of the simulation.

14. The system of claim 12 wherein the operations further comprise:
- providing a run time trace tailored to a particular SSO scenario, the run time trace logging only relevant information related to a login and authentication procedure for the particular SSO scenario.

15. A computer-program product, the computer program product comprising computer-readable instructions embodied on tangible, non-transitory media, the instructions operable when executed by at least one computer to:
- identify a first system for single sign-on capabilities;
- identify a second system disparate from the first system for providing a single sign-on capability with the first system through a cloud-based single sign-on (SSO) configuration manager;
- automatically access metadata associated with the sign-on information of the second system, the set of metadata identifying sign-on-related information for sharing at least one credential/certificate for logging in to the second system;
- use the metadata to obtain an authorization for a single sign-on between the first and second systems;
- receive a request from the first system for authorization at the second system;
- in response to the request, provide the authorization and creating a cloud-based SSO system that includes the first and second systems;
- monitoring a set of certificates associated with at least one of the first or second systems after creating the SSO system;
- determining that at least one of the certificates associated with one of the first or second systems is nearing expiration; and
- alerting a system administrator associated with that system of the nearing certificate expiration.

16. The computer-program product of claim 15, the instructions further operable to execute a simulation to test the cloud-based SSO system after configuration, the simulation comprising operations including:
- receiving information about a test login by a system administrator associated with a particular system associated with the cloud-based SSO system;
- redirecting operations from a particular service provider system associated with the particular system, the redirection going to a particular identity provider system associated with the particular system;
- receiving a user authentication from the particular identify provider system;
- providing information about the user authentication to the particular service provider system;
- subsequently receiving information about a test login by the same system administrator at a different system associated with the cloud-based SSO system;
- determining that the system administrator is already logged into the cloud-based SSO system based on the login of the system administrator at the particular system associated with the cloud-based SSO;
- automatically providing user authentication information to a different service provider system associated with the different system to enable the login of the system administrator at the different system; and
- notifying the system administrator of the results of the simulation.

17. The computer-program product of claim 15, the instructions further operable to:
- provide a run time trace tailored to a particular SSO scenario, the run time trace logging only relevant information related to a login and authentication procedure for the particular SSO scenario.

* * * * *